3,413,868
APPARATUS AND METHODS FOR CONTROLLING A MULTIPLE STAGE GEAR TRANSMISSION MECHANISM
Yoshitoku Iizuka, Saitama-ken, Japan, assignor to Kabushiki Kaisha Honda Gijutsu Kenkyusho, Saitama-ken, Japan
Filed May 9, 1966, Ser. No. 548,650
Claims priority, application Japan, May 10, 1965, 40/36,041
1 Claim. (Cl. 74—371)

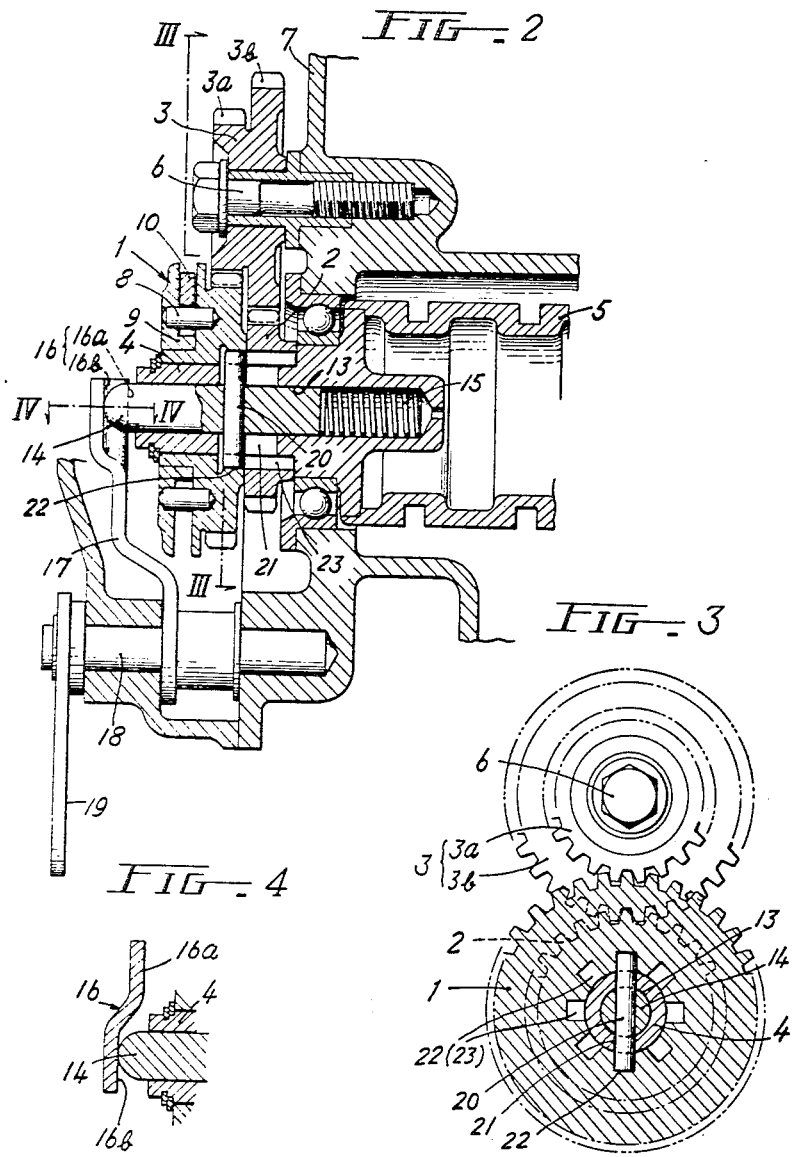

ABSTRACT OF THE DISCLOSURE

Apparatus having a rotatable shift drum for shifting a transmission mechanism between one or plural speed changes in accordance with the magnitude of its angular movement by the action of a control lever which selects one of two gear trains for a single or a plural speed change.

This invention relates to apparatus for controlling a transmission mechanism and more particularly a multiple stage transmission mechanism for a motorcycle.

In the known multiple stage gear transmission mechanism used for a racing motorcycle, or the like, each single operation of an activator member such as a shift pedal, or the like, provides only a single stage speed change, that is, there is produced only a single pitch revolution of a shift drum, so that in this type of transmission mechanism a plurality of operations of the activator member are needed to provide plural stages of speed change which requires time and is an inconvenience.

The present invention has for its principal object to provide apparatus for avoiding the above deficiency.

In such apparatus the number of shift stages effected for each single operation of the activator member can be selected so that a single stage speed change is obtained and/or if desired, a plural stage speed change, such as two stages of speed change can be obtained.

According to the present invention, a first rotatable member which is rotated stepwise, pitch by pitch, by an activator member such as a shift pedal or a shift lever, and a second rotatable member which is in engagement with the first rotatable member through a speed increasing gear train are so arranged that these members may be selectively engaged with a common shift drum, serving as a control member for the transmission mechanism.

An embodiment of the present invention will be described in detail with reference to the accompanying drawing, wherein:

FIGURE 2 is a sectional view taken along the line II—II in FIG. 1;

FIGURE 3 is a sectional view taken along the line III—III in FIG. 2; and

FIGURE 4 is a sectional view taken along the line IV—IV in FIG. 2.

Figure 1:
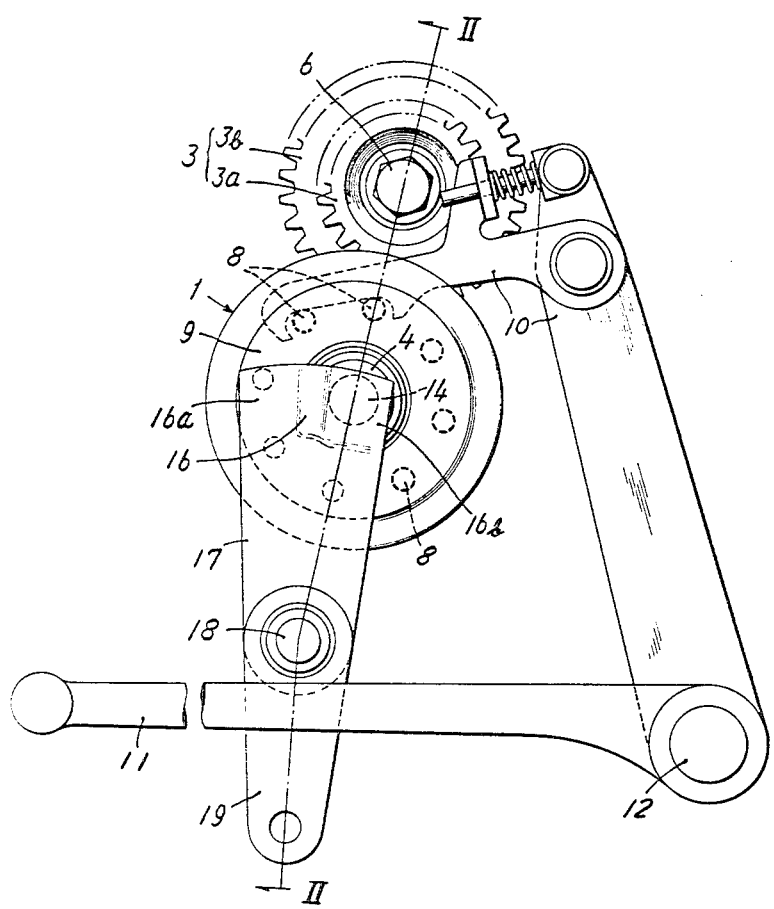
FIGURE 1 is a front view of an embodiment according to the present invention.

Numeral 1 denotes a first rotatable member in the form of a gear and numeral 2 denotes a second rotatable member which is also in the form of a gear and is in engagement with the first rotatable member 1 through a speed increasing gear 3. The members 1 and 2 are mounted rotatably in front and in the rear on a driving shaft 4 connected to a shift drum 5. The shift drum 5 serves to select any one of various speed gear trains in a transmission mechanism in accordance with the angular position thereof in the same manner as that in the conventional transmission mechanism, so that no further detailed explanation of the construction and the operation of the same is needed.

The speed increasing gear 3 comprises a small and large gear 3a and 3b formed integrally one with another, one of which is in mesh with the first rotatable member 1 and the other of which is in mesh with the second rotatable member 2, and the gear ratio of the gear train formed thereby is so designed that one pitch revolution of the first rotatable member 1 causes a plural pitch revolution of the second rotatable member, e.g. two pitch revolutions.

The gear 3 is mounted rotatably on a shaft 6 projecting from a machine frame 7.

The first rotatable member 1 carries a number of pins 8 arranged circumferentially at regular intervals to form thereat a pin sprocket wheel 9, and a pawl lever 10 swingable by an operation member such as a shift pedal 11 on the same shaft 12 is engaged therewith so that the first rotatable member 1 may be rotated either clockwise or counterclockwise, pitch by pitch, for each upwards or downwards pushing operation of the shift pedal 11.

The driving shaft 4 is in the form of a hollow shaft having an axial bore 13, and a push rod 14 is inserted slidably therein. The push rod 14 is acted at one end by a spring 15 and at its other end by a cam surface 16 of a cam lever 17 mounted on the same shaft 18 with a switch lever 19, so that the push rod 14 may be moved forwards and rearwards by movement to the right and left of the lever 19. The cam surface 16 comprises, as clearly shown in FIG. 4, front and rear surface portions 16a and 16b.

The push rod 14 carries at its middle portion an engaging member 20 which is in the form of a transverse pin extending therethrough and fixed to the rod to move therewith. The pin 20 extends in a longitudinal slot 21 in the driving shaft 4 to be slidable therein but rotatable therewith. In the first and second rotatable members 1, 2 there are respectively provided spline grooves 22, 23 which receive the terminal ends of pin 20, so that by forward and rearward movement of the push rod 14, the pin 20 moving therewith may be engaged selectively with either the spline groove 22 of the first rotatable member 1 or the spline groove 23 of the second rotatable member 2.

The operation of the apparatus will now be explained as follows:

In the usual condition, the push rod 14 is in rearward position as shown in the drawing and the pin 20 carried thereby is in engagement with the first rotatable member 1. Accordingly, in this condition, the first rotatable member 1 is in direct connection with the driving shaft 4 through the pin 20, so that one pitch revolution of the first rotatable member 1 produces one pitch revolution of the shift drum 5. Thus, for each operation of shift pedal 11 a single speed change is obtained i.e. one operation produces a one stage speed-change. If the push rod 14 is displaced to bring the pin 20 into engagement with the second rotatable member 2, each pitch revolution of the first rotatable member 1 is transmitted from the second rotatable member 2 through the pin 20 to the driving shaft 4, so that one pitch revolution of the first rotatable member 1 produces a multiple number of pitch revolutions of shaft 4, whereby there is obtained plural stages of speed change for each operation of the shift pedal 11.

The present invention apparatus is particularly advantageous in that there is a choice between obtaining multiple speed change or single speed change for each actuation of the shift pedal, and the switching operation may be obtained very simply by only moving the engaging member forwards and rearwards. This is especially advantageously applicable to a racing motorcycle, or the like, wherein rapid multiple stages for increasing or decreasing the speed change is frequently required.

Numerous modifications and variations of the disclosed invention will now become apparent to those skilled in the art without departing from the scope and spirit of the invention as defined in the attached claims.

What is claimed is:

1. Apparatus for controlling shifting of a transmission mechanism through one or multiple stages, said apparatus comprising an activator member, a first rotatable member, a plurality of engaging members arranged circumferentially on said first member, said activator member comprising a pivotal pawl member for engaging the engaging members on said first member to stepwise rotate the same in either direction, a second rotatable member engaged with the first member and driven thereby through a multiple of the step of said first member, a rotatable control member for effecting shifting of the transmission mechanism between one or multiple speed changes in accordance with the magnitude of rotation of the control member, and externally controlled means movable between first and second positions for selectively engaging the first and second rotatable members with the control member in driving relation to cause the control member to undergo angular movement over a single or multiple step depending on the position of the externally controlled means, thereby to effect shifting of the transmission mechanism correspondingly through one or multiple stages.

References Cited

UNITED STATES PATENTS 292,908   2/1884   Hadley et al. _____ 74—371

DONLEY J. STOCKING, *Primary Examiner.*

H. S. LAYTON, *Assistant Examiner.*